United States Patent

[11] 3,600,937

[72] Inventor Reinhold Hermann Nilberg
463 Beachview Drive, North Vancouver, British Columbia, Canada
[21] Appl. No. 769,447
[22] Filed Oct. 21, 1968
[45] Patented Aug. 24, 1971

[54] PROBES FOR TESTING BUTT END OF POLES
1 Claim, 2 Drawing Figs.

[52] U.S. Cl. ................................ 73/71.5, 73/67.5, 73/69
[51] Int. Cl. ............................................. G01n 24/04
[50] Field of Search ................................ 73/67, 67.1, 67.2, 67.5, 67.6, 67.7, 67.8, 67.9, 69, 71.5

[56] References Cited
UNITED STATES PATENTS
3,066,525  12/1962  Harris .................... 73/67.5 X
3,282,087  11/1966  Dickinson ............... 73/67.5 X
FOREIGN PATENTS
336,766  10/1930  Great Britain ........... 73/67.2

*Primary Examiner*—Richard C. Queissen
*Assistant Examiner*—Arthur E. Korkosz

ABSTRACT: This improvement relates to a pair of spike-type ultrasonic probes for testing the soundness of utility poles at any depth below the ground, by the diametral sound transmission method which correlates the increase in signal travel time, around a rot pocket, to the degree of decay. One probe is the sound-transmitting probe and the other probe, on the opposite side of the butt, is the receiving probe. Each probe comprises a conical head used for hammering the probe into the soil, with a lead hammer, closely along the butt, and for mounting of a transducer, a shaft attached at the upper end to the head, a wedge-type blade attached to the lower end of the shaft. The wedge-type blade is designed to push aside the soil along the butt during hammering and also to make pressure contact for sonic coupling of the probe at the desired point of the butt, when the probe is turned into test position by means of a hand-operated lever or handle mounted at the upper end of the probe.

PROBES FOR TESTING BUTT END OF POLES

Utility poles deteriorate mainly at the ground level showing a rotten layer around the outer circumference. These defective poles are appraised for their strength in accordance with established procedures. An important part of these procedures is boring to the heart of the pole at three or more locations in order to determine the diameter of possible core rot.

Boring is a destructive test method and the following nondestructive methods are being used instead of boring: X-ray radiography; Gamma-ray attenuation; time of sound transmission in diametral direction.

Of the above methods the sound transmission method has the best chances to replace boring because equipment for sound transmission has less weight and there is no radiation hazard to the operator.

The method of sound transmission determines the time required for the signal to travel through the pole in diametral direction. If the time is higher than expected for a sound pole of a certain diameter, then the signal has travelled around a defect and the increase in time is related to the defect by an empirical formula.

The strength of a pole is affected by core rot, side rot and surface rot. Cracks do not affect the strength of the pole.

The disadvantage of the sound transmission method is that cracks cannot be distinguished from rot. Testing of poles for rot is therefore done below ground level where cracks seldom occur.

Spike-type probes, provided with available sonic equipment, test the pole to about 6 inches below ground level. This depth is not sufficient to ensure freedom from cracks.

The common type of internal rot in utility poles is core rot. This rot starts from the butt end. In order to detect this rot as early as possible the pole must be tested at about 3 feet below ground level. Excavations to this level for the purpose of boring are uneconomic.

I have found that testing of utility poles, by the sound transmission method, can be accomplished economically at any desired level below the ground with two special probes. The probes are placed on opposing sides of the pole and then hammered to the desired level. By turning these probes for 90° a triangular blade, at the lower end of the probe, makes adequate contact with the pole for sound transmission.

In drawings which illustrate the embodiments of the invention,

Each probe comprises a round solid steel shaft 1, a conical head 2, a triangular blade 3 and a handle 5.

Head 2 is used for hammering the probe into the soil. Head 2 is also used for mounting of a sonic transducer, either by means of a magnetic holder or by clamping or holding the transducer to the head.

Figure 1:
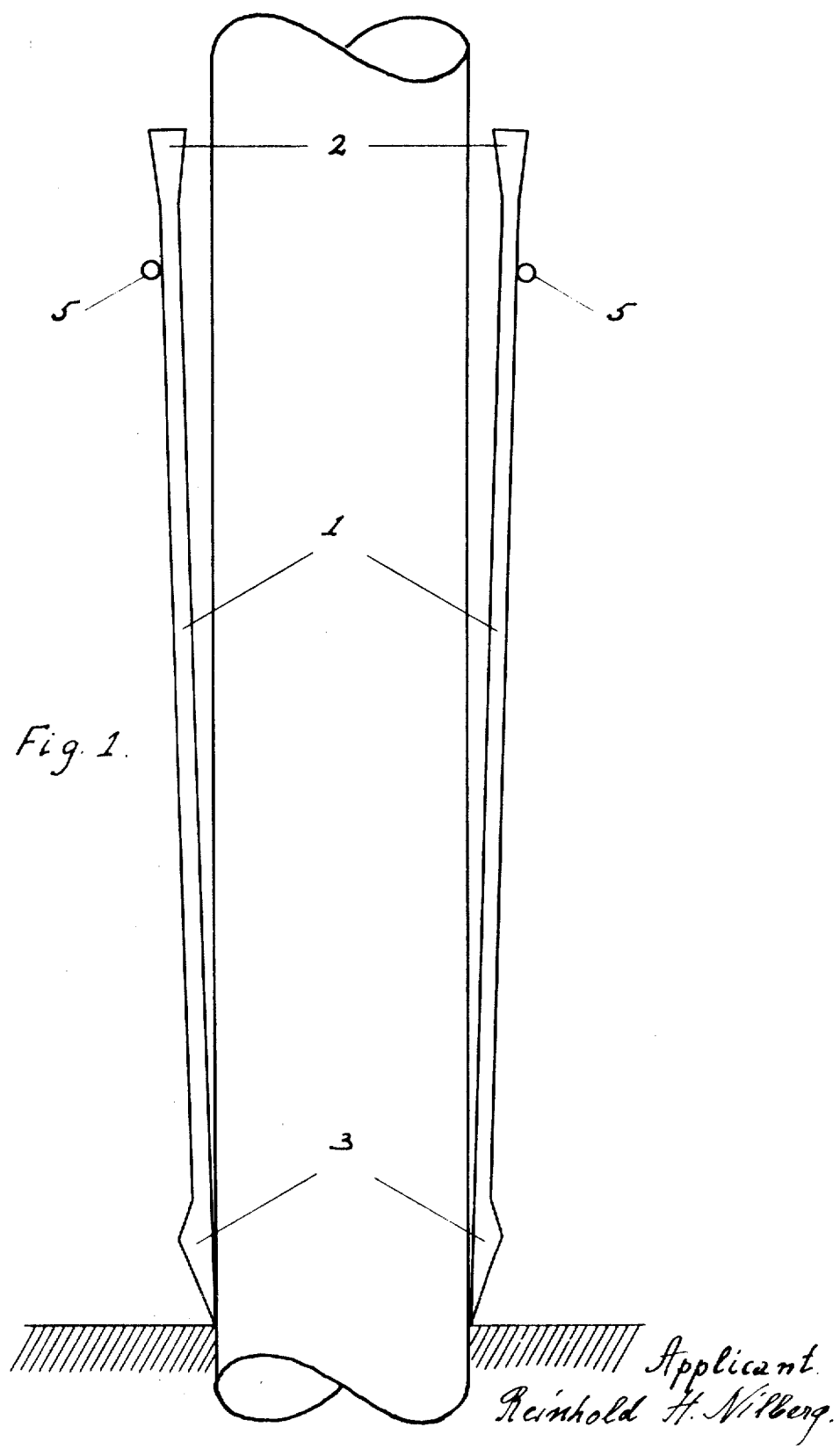
FIG. 1 is a side view of the probes, positioned against the surface of the pole, ready for hammering into the soil.
Figure 2:
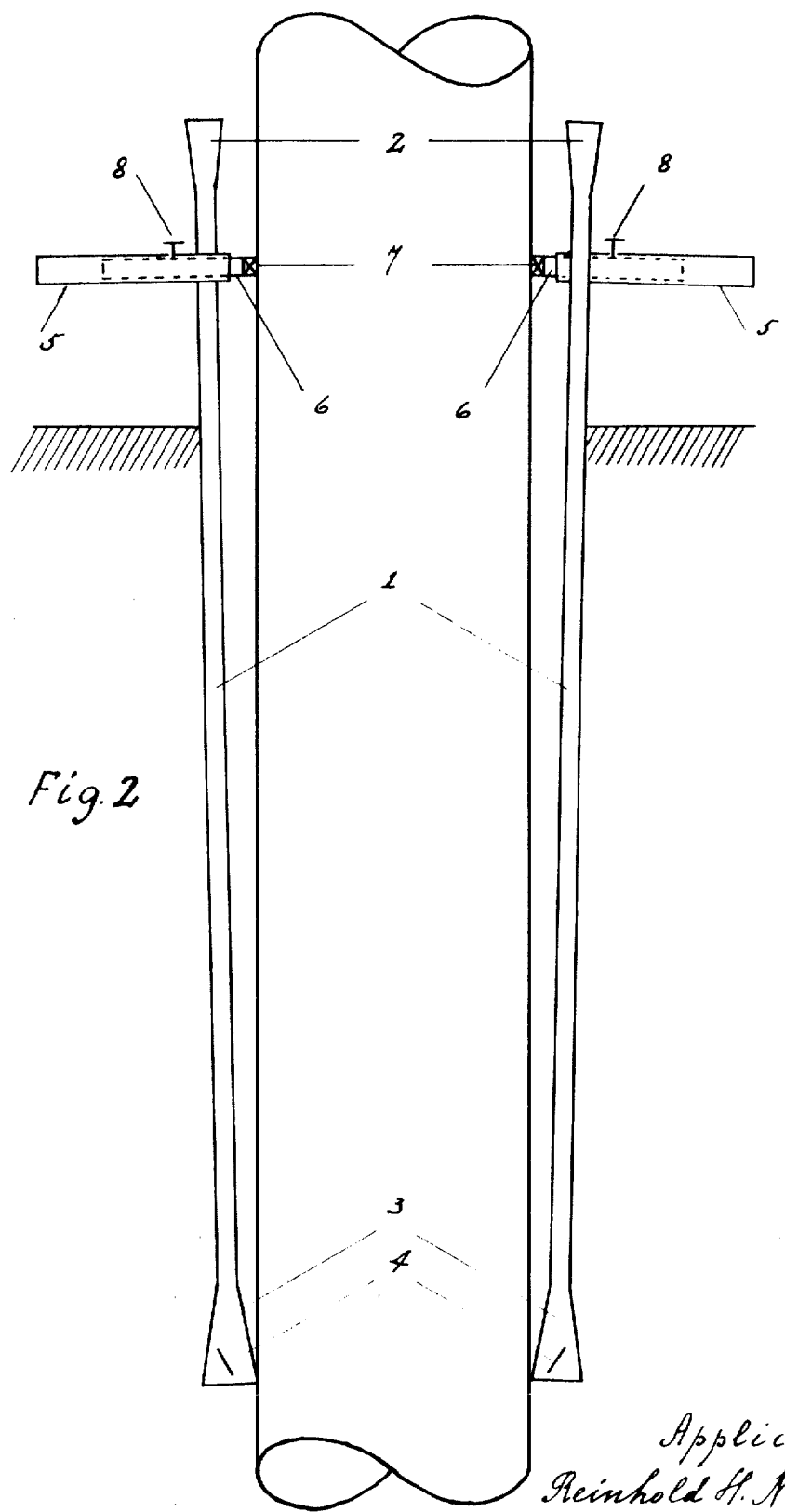
FIG. 2 shows the probes in test position below ground level.

Blade 3 at the lower end of the probe, as shown by FIG. 1, is flat at the pole side and bevelled at the soil side. The purpose of blade 3 is to push aside stones when the probe is hammered into the soil so that shaft 1 is left in a hole of a larger diameter than the shaft in order to avoid undesired contact between shaft and pole when the probe is in test position as shown by FIG. 2. Cut 4 in blade 3 has the purpose of reflecting the sonic signal coming from shaft 1 to the tip of blade 3 which makes contact with the pole and reverse.

Handle 5 is used to turn the probe by 90° after hammering to the desired level. This turn puts the probe into test position and ensures good contact between the tip of blade 3 and the pole and no contact between shaft 1 and the pole.

Tube 6 in handle 5 is provided with a rubber stopper 7 at the outer end. By means of wing screw 8 tube 6 is kept in handle 5 in such a position that there is a pressure between stopper 8 and pole, when the probe is in test position, in order to keep the shaft off the pole. The rubber stopper 7 has also the purpose of eliminating undesired sonic coupling between probe and pole.

Although there has been shown and described herein a preferred form of the invention, it is to be understood that the invention is not necessarily confined thereto, and that any change in the structure and the relative arrangement of components are contemplated as being within the scope of the invention, defined by the claims appended.

I CLAIM:

1. Two spike-type sonic probes, for being hammered into the soil on opposing sides of a utility pole parallel to and closely along the butt, for coupling sonic transducers above ground to opposing contact points on the buried butt at any depth, to achieve a soundness test by the diametral sound transmission method, whereby one probe is a transmitter probe and the other a receiver probe, each probe comprising in combination:

a solid shaft, of adequate length with respect to the butt, for sound transmission between said transducer above ground and said contact point below ground, a solid conical head at the upper end of said shaft for low loss sound transmission from a transducer to said shaft, said conical head at the smaller diameter end solidly welded or forged to said shaft of same diameter, and said head at the other end a flat surface for hammering the probe into the soil and for mounting of a sonic transducer, wherein the improvement comprises:

means for wedging a vertical hole into the soil, said means mounted at the lower end of said shaft and designed to wedge a hole of larger cross section than said shaft tightly along the butt when the probe is hammered, so that said shaft in the hole will not touch the butt when the probe is in test position, means for making a pressure contact point for sonic coupling of the lower end of said shaft to the butt, when the probe is turned into test position, so that the pressure at said contact point is essentially perpendicular to said shaft and butt, means for deflecting part of the sonic beam, coming down along said shaft, into the direction of said pressure contact point when the probe is a transmitter and for deflecting the sonic beam, coming from pressure contact point, up into the direction of said shaft when the probe is a receiver, means, at the upper end of said shaft, for turning the probe into test position after hammering the probe to the desired depth, whereby generating pressure contact between butt and said means for making a pressure contact point, means for spacing the upper end of said shaft off the pole when the probe is in test position, whereby pressure is generated between said means for spacing and the pole, so that the pressure is essentially perpendicular to said shaft and pole, said means for spacing also providing acoustical isolation of said shaft from the pole, said shaft designed for high bending strength, so that perpendicular pressure forces, from said means for spacing and from said means for making a pressure contact point and from the pressure of the soil on said shaft, are balanced without excessive bending of said shaft, to prevent said shaft from touching the butt when the probe is in test position.